Patented Jan. 4, 1949

2,457,825

UNITED STATES PATENT OFFICE 2,457,825

ACYLATING THIOPHENE

Alvin I. Kosak, Columbus, Ohio, and Howard D. Hartough, Pitman, N. J., assignors to Socony-Vacuum Oil Company, Incorporated, a corporation of New York No Drawing. Application September 28, 1945, Serial No. 619,250

17 Claims. (Cl. 260—329)

This invention relates to a process for the acylation of thiophenes and more particularly is directed to a catalytic method for acylating thiophene and its derivatives in the presence of a small amount of iodine.

Acylation reactions are well known in the art and connote the union between acyl radicals and molecules of organic compounds under conditions of temperature, pressure, and time ordinarily referred to in the art as acylating conditions. The compounds thus produced represent, structurally, the addition of the original acyl radical to the organic compound molecule.

As a general rule, the temperature, pressure and time of reaction employed in acylation operations depend upon whether the acylation is effected in the absence or presence of acylation catalysts. The two methods are generally referred to as thermal and catalytic acylation respectively. The majority of acylation processes fall under the latter category and it is a catalytic acylation process with which the present invention is concerned.

Acyl radicals may be furnished in acylation reactions by various materials commonly referred to as acylating agents. Thus, the anhydrides of carboxylic acids, acyl halides, and acyl nitriles have served as sources of the acyl radical. In particular acetic anhydride and acetyl chloride have found wide application as acylating agents.

The acylation of thiophene and thiophene derivatives has previously been carried out employing one of the above mentioned acylating agents in the presence of various catalysts including aluminum chloride, stannic chloride, titanium tetrachloride, phosphorus pentoxide and 2-chloromercurithiophene. Other methods of making acylated thiophenes have included dry distillation of calcium salts of thiophene carboxylic acids and the action of nitriles on thienylmagnesium iodide.

Of these processes, the catalytic methods employing Friedel-Crafts type catalyst such as aluminum chloride, stannic chloride, and titanium tetrachloride have been used most extensively. These catalysts, although applicable with considerable success in the acylation of aromatic hydrocarbons, are only moderately successful where thiophene is involved. This appears to be due to the relative instability of the thiophene ring; the Friedel-Crafts catalyst, for example aluminum chloride, attacking the sulfur atom of the thiophene ring and causing many undesirable secondary reactions with concomitantly low yields of acyl thiophenes. Furthermore, it has been postulated that compounds such as aluminum chloride form addition complexes with the carbonyl group of the resulting ketone substantially decreasing the yield of desired product and requiring a considerable excess of aluminum chloride over the theoretical amount required for the acylation process. Thus, when aluminum chloride is used as the condensing agent, the ratio of catalyst to acyl chloride is at least one and in the case of acid anhydrides at least two. Likewise, other catalysts such as stannic chloride must be used in molecular quantities with respect to the acyl halide being employed in the acylation of thiophene. This is probably due to the fact that acyl halides form comparatively stable molecular complexes with aluminum chloride and stannic chloride thereby diminishing their catalytic effect.

Moreover, the use of aluminum chloride as a catalyst in the acylation of thiophene entails strict observance of detail in experimental conditions. Thus, it is known that thiophene and aluminum chloride react vigorously in carbon disulfide suspension. It has been reported that a moderately good yield of phenylthienyl ketone is obtained by adding a solution of benzoyl chloride and thiophene in carbon disulfide to a suspension of aluminum chloride in the same solvent. If, however, a carbon disulfide solution of the acid chloride was added to a suspension of thiophene and aluminum chloride, much tar was formed and a low yield of ketone resulted. The acylation of thiophene has accordingly been an exceedingly difficult reaction to carry out, the usual acylation catalysts causing excessive resinification of the thiophene reactant. The resinification usually occurs before acylation can be effected and if the expected reaction product is formed, it is generally only in very small amounts. The difficulties inherent in prior art catalytic acylation of thiophene were believed to be due at least in part to the relatively large quantities of catalyst being employed, that is, amounts of the order of molecular quantities with respect to reactants being used. Attempts were accordingly made to overcome the existent difficulties by the use of traces or catalytic amounts of aluminum chloride. Minute amounts of this compound, however, failed to catalytically produce any of the desired thienyl ketone.

It has now been discovered that iodine and in general compounds or materials forming iodine under the acylation conditions, said compounds or materials hereinafter being referred to as iodine formers, catalyze the acylation of thiophene. It has been found that by using an iodine catalyst, the above mentioned difficulties encountered in the acylation of thiophene have largely been overcome. It would appear that the advantages obtained using an iodine catalyst can be attributed to the fact that relatively small quantities of iodine or iodine former can be used as effective catalysts in the acylation of thiophene. By employing an iodine catalyst in relatively small quantities, the undue resinification and formation of addition complexes formerly encountered in the catalytic acylation of thiophene have been substantially eliminated, the products resulting being almost entirely acyl thiophenes having one or more side chains corresponding to that of the acylating agent. It has been found in accordance with this invention that iodine employed in relatively small amounts in comparison to the quantity of thiophene or acylating agent used, effects the acylation of thiophene smoothly and specifically in contrast to the more conventional acylation catalysts employed heretofore, giving a substantial yield of desired ketone without accompanying formation of complex addition products and resinification. The acylation of thiophene, using an iodine catalyst moreover can be carried out in a relatively simple and direct manner without a detailed observance of experimental conditions such as is a necessary precaution to be taken when aluminum chloride is employed as catalyst.

It is accordingly an object of the present invention to provide an efficient process of synthesizing acylated thiophenes. Another object is to provide a process for catalytically acylating thiophene and its derivatives. A still further object is to afford a process for catalytically acylating thiophene in a direct manner which can easily be carried out using a relatively inexpensive catalyst in small amounts. A very important object is to provide a process capable of reacting thiophene or its derivatives with an acylating agent in the presence of an efficient catalyst without undue formation of addition complexes between the catalyst and thiophene or between the catalyst and acylating agent.

These and other objects which will be recognized by those skilled in the art are attained in accordance with the present invention wherein thiophene or its derivatives are acylated by reaction with organic carboxylic acid anhydrides or acyl halides in the presence of a small amount of iodine or iodine former.

Aside from iodine itself, the most effective compound found for forming iodine under the acylation conditions, that is as iodine former, was hydriodic acid. This material may be used as a relatively dilute solution or as saturated solution containing approximately 90 percent hydrogen iodide. A particularly convenient hydriodic acid solution, however, for purposes of the present invention was found to be the acid of maximum boiling point containing approximately 55-58% of hydrogen iodide. The aqueous solution of hydriodic acid when freshly prepared is colorless but rapidly becomes brown when exposed to air owing to the formation of iodine which dissolves in the acid. It is this property of hydriodic acid which renders it an effective catalyst for acylation of thiophene in accordance with the process of this invention. Iodine formation is thus believed to be accounted for by the following equation: $4HI + O_2 = 2H_2O + I_2$. Other iodine formers contemplated for use as catalysts in the present invention include iodine dioxide which decomposes on heating under acylation conditions to yield iodine as denoted by the equation $$5I_2O_4 = 4I_2O_5 + I_2$$

Likewise other iodine containing compounds may be employed such as certain iodates or oxygen-containing acids of iodine which in the presence of reducing agents yield iodine under the acylation conditions. However, for all practical purposes iodine itself is to be preferred as catalyst for acylating thiophene in accordance with the present process. Iodine may be introduced as acylation catalyst in the form of vapor, solution, or solid. The latter form is most conveniently handled and accordingly is to be preferred. While the present invention is not to be strictly limited to any specific small amount of catalyst, generally, iodine will be employed in amounts of the order of about 1/100 of the amount of the Friedel-Crafts catalysts heretofore used in the acylation of thiophene. The quantity of iodine or iodine former used herein will ordinarily be such that the amount of iodine present in the reaction mixture will vary between about 0.01% and about 3% by weight of the reactants.

It is generally believed that the chemical behavior of thiophene is very similar to that of benzene. However, there are some very striking differences. This is illustrated by the fact that the acylating catalysts ordinarily used for the acylation of benzene are not suitable for the acylation of thiophene. Moreover, catalysts which readily effect the acylation of thiophene will not always effect the acylation of benzene. This is particularly true in the present invention. The small quantities of iodine which permit the acylation of thiophene to proceed smoothly and efficiently are inactive in the acylation of benzene. Thus, a small quantity of iodine which is inactive catalytically in the acylation of benzene, is in accordance with the present invention a preferable catalyst for the acylation of thiophene.

The acylating agents to be used herein may be an organic carboxylic acid anhydride or an acyl halide. These may be derived by methods well known to the art from mono or dibasic organic acids which may be either unsaturated or saturated. Thus representative acylating agents to be used in this invention include the anhydrides of saturated fatty acids such as acetic anhydride, propionic anhydride, etc.; the acyl halides of saturated fatty acids such as acetyl chloride, stearyl chloride etc.; the anhydrides of dibasic acids such as phthalic anhydride; the acyl halides of dibasic acids such as phthalyl chloride; the anhydrides of unsaturated acids such as crotonic anhydride and the acyl halides of unsaturated acids such as crotonyl chloride. These acylating agents are given merely by way of examples and are not to be construed as limiting since other acyl halides or anhydrides of carboxylic acids which will readily suggest themselves to those skilled in the art may likewise be used. It is to be noted that acyl nitriles and carboxylic acids which have been employed in some acylation reactions, fail to acylate thiophene under the conditions of the present process and hence are not to be included herein as acylating agents.

Thiophene or derivatives of thiophene having one or more substituent groups such as halogen, alkyl, aryl, or alkoxy groups attached to the thiophene ring may be acylated in accordance with this invention. The 2- and 5- positions in the thiophene ring being adjacent to the sulfur atom are generally much more reactive than the 3- and 4- positions and in acylating thiophene the entering acyl group will preferably attach itself to the carbon atom adjacent to the sulfur. When the 2- position of the thiophene ring is already occupied by a substituent group or atom, the entering acyl group will preferably attach itself to the 5- position. When the 3- position is occupied, the acyl substituent will enter for the most part at the 2- position. However, in some instances a small portion of the 3,5-product may be obtained. Thiophene derivatives having substituents of a highly negative character such as carbonyl, ester, nitro and cyano groups and no activating substituent such as a hydroxy or alkoxy group do not acylate readily. These groups, commonly referred to as meta-directing, possess a highly electronegative character which tends to inhibit the acylation reaction.

The acylation of thiophene may be carried out employing equimolar quantities of thiophene and acylating agent. However, the presence of an excess of one of the reactants has been found to give an increased yield of the desired product. Thus, an excess of either acylating agent or thiophene gave an increased amount of ketone as compared with those reactions in which equimolar quantities were used.

The temperature at which the reaction is carried out may vary over a wide extent, the upper limit of temperature being dependent on the boiling point of the reactants at the specific pressure of the reaction. In general, temperatures varying between about −30° C. and about 150° C. and pressures varying between atmospheric and about 6 atmospheres have been found satisfactory for effecting the acylation reaction. The effect of increased pressure, theoretically, is toward increased reaction, but from a practical standpoint this is not a very great effect with reactions such as involved herein which go readily at normal pressures. The temperature to be employed will depend on the time of reaction and the nature of the acylating agent used. Generally, the lower temperatures will be employed when acyl halides are used as acylating agents. Utilization of super-atmospheric pressures allows the employment of higher temperature, but these appear to be generally unnecessary as the reaction is complete in about one hour or less when refluxing at ordinary pressures using about 1 per cent by weight of iodine based on the weight of the reactants. A materially longer reaction period is to be avoided since there is a tendency for decomposition to occur, especially when hydriodic acid is employed as iodine former. With this catalyst, a strongly exothermic reaction occurs after refluxing has progressed for about one-half to one hour depending upon the amount of catalyst used. It is essential that heating be discontinued after this reaction takes place, since the amount of decomposed material increases rapidly. For example, it has been found that heating an acylation reaction mixture for one-half hour after the evolution of heat resulted in almost complete carbonization of the material. While this factor is not as critical where iodine itself is used, there is no apparent advantage in continuing the reaction after the temperature of the solution reaches about 120° C. The time it takes to reach this temperature depends upon the amount of catalyst present; with 1 per cent by weight of iodine, it is approximately one hour.

It is preferable to employ a quantity of iodine catalyst varying between about 0.01 and about 3 per cent by weight of the reactants. Amounts of iodine smaller than about 0.01 per cent by weight of the reactants do not function efficiently in promoting the acylation of thiophene requiring an excessively long reaction period or in some instances failing entirely to catalyze the reaction. On the other hand, amounts of iodine exceeding about 3 per cent by weight of the reactants cause violent exothermic reactions which are extremely difficult to control. However, iodine present in amounts of about 1 per cent by weight of reactants has been found to give excellent results under the acylating conditions of the process of this invention.

While the present invention is not to be limited by any theory, the catalytic action of materials other than iodine disclosed herein as suitable acylation catalysts for thiophene is believed to be intimately connected with the fact that they yield iodine under the temperature conditions of the acylation process. A very marked example of this effect is the catalytic action of hydriodic acid which tends to decompose forming iodine during the acylation process. It is of interest to note that the other hydrohalogen acids such as hydrochloric, hydrobromic, or hydrofluoric acid fail to exert any catalytic action in the acylation of thiophene. Likewise iodic acid and iodic anhydride do not exhibit any tendency to promote the acylation reaction, although if a reducing agent is introduced into the reaction mixture causing the reduction of iodic acid to iodine, the acylation reaction takes place.

The following detailed examples are for the purpose of illustrating modes of effecting the acylation of thiophene in accordance with the process of this invention. It is to be clearly understood that the invention is not to be considered as limited to the specific acylating agents disclosed hereinafter or to the specific conditions set forth in the examples.

*Example 1*

A mixture of 84 grams (1 mol) of thiophene, 107 grams (1 mol) of 95% acetic anhydride and 2 grams of iodine was heated to reflux and boiled for 1 hour. The temperature of reflux rose rapidly from 85–95° C. After boiling about 10 minutes at this temperature, an exothermic reaction occurred and the temperature began to rise steadily, being 133° C. when the reaction was terminated. The product was poured into sodium thiosulfate solution to remove iodine. The organic layer was separated and neutralized with sodium carbonate solution. The aqueous layer was extracted with chloroform and the extract added to the neutralized organic layer which was then distilled. 96 grams (76% of theory) of 2-acetylthiophene boiling at 64° C. under 2 mm. pressure were collected.

*Example 2*

A mixture of 84 grams (1 mol) of thiophene, 78.5 grams (1 mol) of acetyl chloride, and 2 grams of iodine was slowly brought to the reflux temperature and boiled at 61–70° C. for 2.8 hours. The product was poured into water, and the iodine removed by means of sodium thiosulfate. The organic layer was neutralized with sodium bicarbonate solution and dried over activated alumina. Distillation of this solution gave 20 grams (15.9% of theory) of 2-acetylthiophene boiling at 64° C. under 2 mm. pressure.

Example 3

A mixture of 84 grams (1 mol) of thiophene, 107 grams (1 mol) of 95% acetic anhydride and 3.6 grams of 55-58% hydriodic acid was refluxed for 55 minutes. The temperature of the solution which remained 84-96° C. until almost the end of the reaction period, rapidly rose at that point, even after the source of external heat had been removed and actual refluxing had ceased. The maximum temperature was 127° C. The cooled reaction product was poured into water and neutralized. The aqueous layer was drawn off and extracted with a small amount of chloroform. The extract was added to the organic layer which was then distilled. 94 grams (74.6% of theory) of 2-acetylthiophene, boiling at 64° C. at 2 mm. pressure were collected.

Example 4

A mixture of 84 grams (1 mol) of thiophene, 107 grams (1 mol) of 95% acetic anhydride and an amount of iodine equivalent to 0.1% by weight of the reactants was heated to a reflux of 99° C. The temperature rose slowly from 99° C. to 125° C. over a period of 2.25 hours when the reaction was terminated. Iodine was removed from the product with sodium thiosulfate solution. The organic layer was separated and neutralized with sodium carbonate solution. The aqueous layer was extracted with chloroform and the extract added to the neutralized organic layer which was distilled to give a yield of 60% of 2-acetylthiophene. No tarry residue was obtained during the reaction and unreacted thiophene could be readily recovered.

Example 5

A mixture of 84 grams (1 mol) of thiophene, 107 grams (1 mol) of 95% acetic anhydride and an amount of iodine equivalent to 0.01% by weight of the reactants was heated to reflux at a temperature of 99-100° C. for a period of 12 hours. The reaction was terminated at the end of this time and treated as in Example 4. Only 1 gram of 2-acetylthiophene amounting to 0.8% yield was obtained indicating that the lower limit of catalytic activity of iodine is of the order of 0.01% based on the weight of the reaction mixture.

Example 6

Thiophene (0.5 mol) and 95% acetic anhydride (0.5 mol) were mixed together in a reaction vessel provided with a thermometer. The temperature at mixing was 29° C.; one gram of iodine was added at this point. Within 15 minutes the temperature had risen to a maximum of 92° C. and thereafter began to drop steadily. After the temperature had returned to room temperature of approximately 30° C., the reaction mixture was worked up as in Example 4 and 39 grams (62% yield) of 2-acetylthiophene was obtained.

From the above examples it will be seen that small amounts of iodine are effective catalysts for the acylation of thiophene. Likewise thiophene derivatives having one or more substituent groups attached to the thiophene ring may be acylated in accordance with this invention. The acylated thiophenes as produced in accordance with this invention have found a variety of uses and may be employed as solvents, dye intermediates, addition agents for petroleum fractions, plasticizers, odorants, perfume diluents, resin intermediates and intermediates for chemical synthesis. Long chain alkyl thienyl ketones may be utilized as synthetic lubricants, waxes, extreme pressure additives for mineral oils and antifoaming agents.

We claim:

1. A process for nuclear acylation of an acylatable thiophene, comprising reacting an acylatable thiophene with an acylating agent selected from the group consisting of acyl halides and anhydrides of carboxylic acids in the presence of an iodine catalyst.

2. A process for nuclear acylation of an acylatable thiophene, comprising reacting an acylatable thiophene with an acylating agent selected from the group consisting of acyl halides and anhydrides of carboxylic acids in the presence of an iodine catalyst and forming said catalyst in the reaction mixture by the generation therein of iodine during the course of the aforesaid acylation.

3. A process for nuclear acylation of an acylatable thiophene, comprising reacting an acylatable thiophene with an acylating agent selected from the group consisting of acyl halides and anhydrides of carboxylic acids in the presence of an iodine catalyst and forming said catalyst in the reaction mixture by the generation therein of iodine from hydriodic acid during the course of the aforesaid acylation.

4. A process for nuclear acylation of an acylatable thiophene, comprising reacting an acylatable thiophene with an acylating agent selected from the group consisting of acyl halides and anhydrides of carboxylic acids in the presence of between about 0.01 and about 3 per cent by weight of an iodine catalyst.

5. A process for nuclear acylation of an acylatable thiophene, comprising reacting an acylatable thiophene with an acylating agent selected from the group consisting of acyl halides and anhydrides of carboxylic acids in the presence of between about 0.01 and about 3 per cent by weight of an iodine catalyst and forming said catalyst in the reaction mixture by the generation therein of iodine during the course of the aforesaid acylation.

6. A process for nuclear acylation of an acylatable thiophene, comprising reacting an acylatable thiophene with an acylating agent selected from the group consisting of acyl halides and anhydrides of carboxylic acids in the presence of between about 0.01 and about 3 per cent by weight of an iodine catalyst and forming said catalyst in the reaction mixture by the generation therein of iodine from hydriodic acid during the course of the aforesaid acylation.

7. A process for nuclear acylation of thiophene, comprising reacting thiophene with an acylating agent selected from the group consisting of acyl halides and anhydrides of carboxylic acids in the presence of an iodine catalyst.

8. A process for nuclear acylation of thiophene, comprising reacting thiophene with an acylating agent selected from the group consisting of acyl halides and anhydrides of carboxylic acids in the presence of between about 0.01 and about 3 per cent by weight of an iodine catalyst.

9. A process for nuclear acylation of thiophene, comprising reacting thiophene with an acylating agent selected from the group consisting of acyl halides and anhydrides of carboxylic acids in the presence of an iodine catalyst and forming said catalyst in the reaction mixture by the generation therein of iodine during the course of the aforesaid acylation.

10. A process for nuclear acylation of thiophene, comprising reacting thiophene with an acylating agent selected from the group consisting of acyl halides and anhydrides of carboxylic acids in the presence of an iodine catalyst and forming said catalyst in the reaction mixture by the generation therein of iodine from hydriodic acid during the course of the aforesaid acylation.

11. A process for nuclear acylation of thiophene, comprising reacting thiophene with an anhydride of a carboxylic acid in the presence of an iodine catalyst.

12. A process for nuclear acylation of an acylatable thiophene, comprising reacting an acylatable thiophene with an anhydride of a fatty acid in the presence of an iodine catalyst.

13. A process for nuclear acylation of thiophene, comprising reacting thiophene with acetic anhydride in the presence of between about 0.01 and about 3 per cent by weight of an iodine catalyst.

14. A process for nuclear acylation of thiophene, comprising reacting thiophene with acetyl chloride in the presence of between about 0.01 and about 3 per cent by weight of an iodine catalyst.

15. A process for nuclear acylation of thiophene, comprising reacting thiophene with an acylating agent selected from the group consisting of acyl halides and anhydrides of carboxylic acids in the presence of between about 0.01 and about 3 per cent by weight of an iodine catalyst at a temperature between about −30° C. and about 150° C., removing iodine from the product resulting from the aforesaid reaction, neutralizing said product and distilling to obtain an acylated thiophene.

16. A process for nuclear acylation of thiophene, comprising reacting thiophene with an acylating agent selected from the group consisting of acyl halides and anhydrides of carboxylic acids in the presence of between about 0.01 and about 3 per cent by weight of an iodine catalyst at a temperature between about −30° C. and about 150° C., forming said catalyst in the reaction mixture by the generation therein of iodine during the course of the aforesaid acylation, removing iodine from the product resulting from said reaction, neutralizing said product and distilling to obtain an acylated thiophene.

17. A process for nuclear acylation of thiophene, comprising reacting thiophene with an acylating agent selected from the group consisting of acyl halides and anhydrides of carboxylic acids in the presence of between about 0.01 and about 3 per cent by weight of an iodine catalyst at a temperature between about −30° C. and about 150° C., forming said catalyst in the reaction mixture by the generation therein of iodine from hydriodic acid during the course of the aforesaid acylation, removing iodine from the product resulting from said reaction, neutralizing said product and distilling to obtain an acylated thiophene.

ALVIN I KOSAK.
HOWARD D. HARTOUGH.

REFERENCES CITED

The following references are of record in the file of this patent:

UNITED STATES PATENTS

| Number | Name | Date |
|---|---|---|
| 2,396,144 | Anderson | Mar. 5, 1946 |

OTHER REFERENCES

Gilman, "Organic Chemistry," Edition 2, vol. 1, pages 181, 183. John Wiley, N. Y. 1943.

Chemical abstracts 25:2719 (2) (1930).

Alles, J. Pharm. and Exp. Ther. 72, 265 (1941).

Richter, "Organic Chemistry," 649, 650. John Wiley, N. Y. 1938.